UNITED STATES PATENT OFFICE.

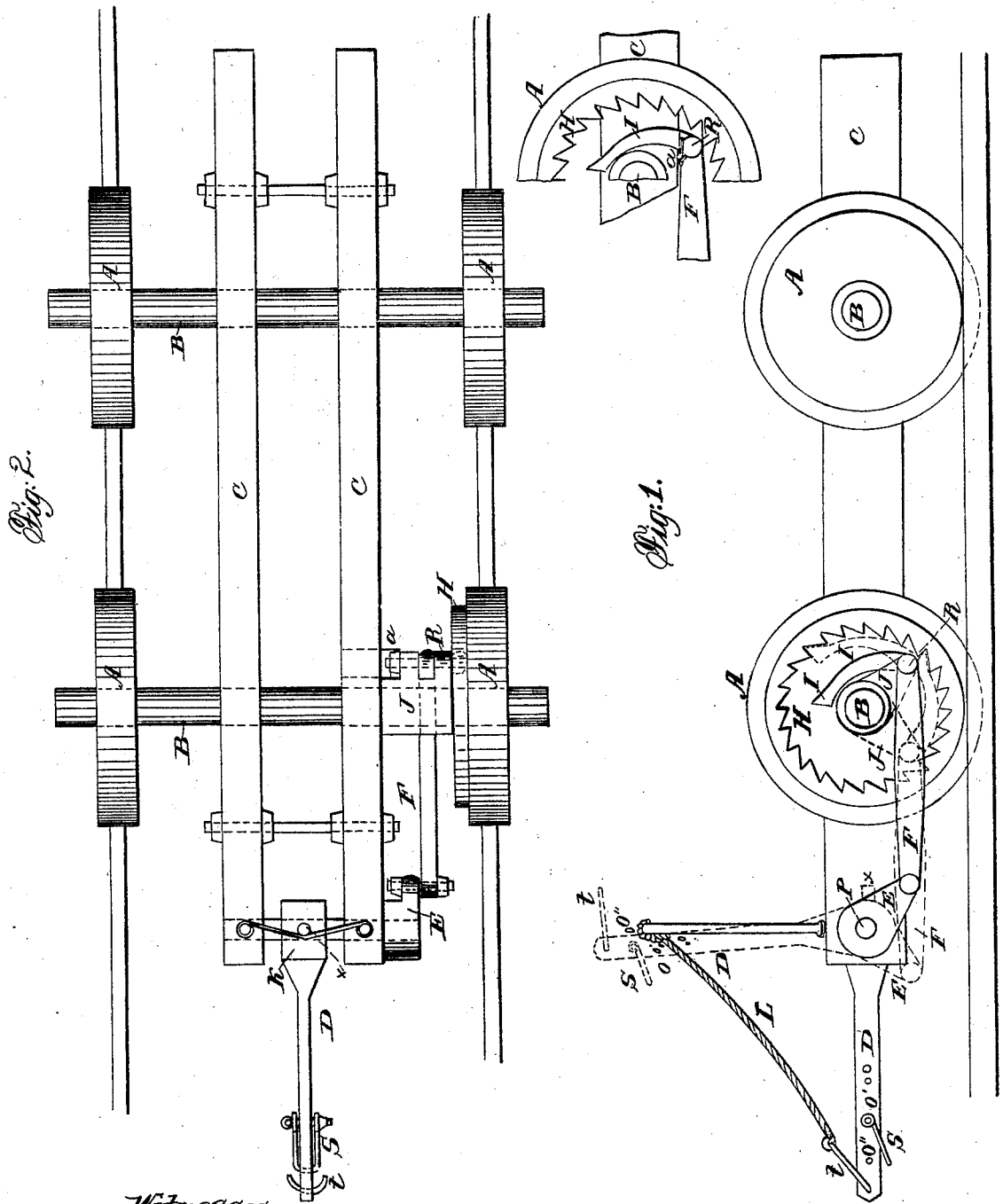

T. F. KUMS AND W. W. BURSON, OF ROCKFORD, ILLINOIS.

IMPROVED METHOD OF STARTING STREET-CARS.

Specification forming part of Letters Patent No. 57,925, dated September 11, 1866.

*To all whom it may concern:*

Be it known that we, T. F. KUMS and W. W. BURSON, of Rockford, in the county of Winnebago and State of Illinois, have invented a new and useful Device for Starting Street-Cars and other Wheel-Carriages; and we do hereby declare that the following is a full, clear, and exact description of the same, reference being had to the accompanying drawings, forming part of this specification, and to the letters of reference marked thereon.

In the drawing, Figure 1 is a top view of the car. Fig. 2 is a side elevation, the dotted lines showing the position of lever D and its connecting parts in position for starting the car, and the full lines the position of the same when drawing the car. Fig. 3 shows the device for throwing pawl I out of gear.

Our invention has reference to the starting of street-cars and other wheel-carriages; and it consists of sundry devices hereinafter to be described.

In the drawings, A A A A are the wheels, and B B the axles of the car. The pieces C C are supported on the axles B B. The lever D is supported on rod P, which passes through the pieces C C, which has the crank E secured to its end. Upon the wheel A is secured the ratchet-rim H, in which the pawl I operates, which is moved by the crank E by means of the thrust-bar F, and held properly in its place by the tie-piece J fitting loosely upon the axle B.

In operation, the tongue or pole to which the team is hitched is secured to clevis S of the lever D, being in the position shown by the dotted lines when the draft of the team brings this lever forward, which brings pawl I within the ratchet H by means of the crank E acting through the thrust-bar F, thereby turning the wheels and of course starting the car, Fig. 1.

In our invention especial attention is asked to the following points:

First, by estimating the proportional length of lever D and crank E any desired advantage can be gained in starting the car. The further the clevis S is placed from the bearing of rod D the greater the advantage gained in starting. The holes o o′ o″ in said lever will accommodate in this particular, for, by varying the clevis S in the different holes, any desired advantage can be gained. It will be observed that crank E is but a continuation of lever D below its bearing, but is changed in position on said rod P for convenience. The thrust-bar F transmits the power of crank E to pawl I, and could be dispensed with, as also tie-piece J and the pawl I be attached directly to crank or lever E, if the axles B B were near enough the ends of the car. The ratchet H may be placed anywhere on the axle B, and may have external or internal teeth.

Second, the lever D in starting the car is brought to the position shown in Fig. 1, full lines, when the draft is the same as by any other attachment or place of applying the power, and to relieve the concussion caused by stopping the lever in that position the spring K extends from C to C, and the stud or set-screw *x* holding lever D upon its bearing P coming against said spring, relieves the stopping of said lever D. The spring K may be replaced with rubber and the place of putting it may be varied in several different positions with much the same result.

Third, the lever D being secured rigid to the shaft P by the set screw *x* may be varied in its direction or angle, as desired, for convenience of hitching to it, and any other purpose requiring change or adjustability of position of said lever.

Fourth, the pawl I being rigid upon the pin R, the flattened side of the head of said pin coming in contact with the plate *a*, which extends outside the piece C, being fastened to its lower surface, Fig. 3, causes the pawl to be thrown out of gear when the lever is drawn fully down, thereby avoiding the friction and noise of the ratchet and pawl acting upon each other when the car is in motion.

Fifth, the lever D may be held rigid while the car is being drawn by means of any conveniently arranged ratchet and pawl; but if such device is used it will require the attention of the driver or conductor to raise such pawl when the lever D is to be raised preparatory to starting. When the lever D is allowed free play it will assume the proper position for starting the car by stopping the team while the car is in motion, by backing the team, or by drawing up the said lever D by means of the cord L or its equivalent attached to the clevis of lever D.

Sixth, lever D may be used by hand for starting the car, in which case it should be longer than when to be used by horse-power, and the device may be used in assisting the car over places of unusual difficulty by stopping and backing the team, so as to give them the advantage of lever D as often as may be necessary.

Seventh, the entire mechanism, except lever D, is placed below the car-body and supported by the axles of the car, thereby avoiding any interference with the action of the car-springs.

The mechanism above described must be repeated for each end of the car in order to move in both ways, and the pawl I of the rear mechanism must be held permanently out of gear by any convenient device.

What we claim as our invention, and desire to secure by Letters Patent, is—

1. The combination and arrangement of lever D, crank E, thrust-bar F, pawl I, ratchet H, and tie-piece J, or their equivalents, operating substantially as described, and for the purpose set forth.

2. The combination and arrangement of the lever D with spring K and stud $x$, or their equivalents, substantially as described.

T. F. KUMS.
W. W. BURSON.

Witnesses:
 THOS. J. RUDD,
 C. S. HORSMAN.